Figure 1:
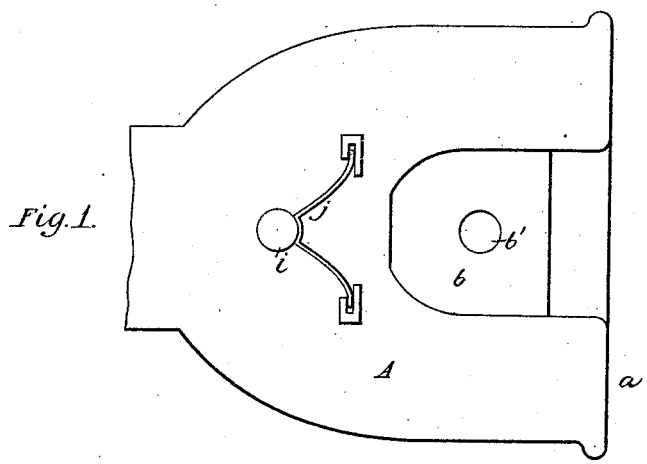

(No Model.) 4 Sheets—Sheet 1.
W. R. TEEGUARDEN & R. A. & J. G. CLARK.
CAR COUPLING.

No. 496,494. Patented May 2, 1893.

Fig. 2ª

Witnesses

Inventors
William R. Teeguarden
Robert A. Clark
John G. Clark
By their Attorneys (No Model.) 4 Sheets—Sheet 2.

W. R. TEEGUARDEN & R. A. & J. G. CLARK.
CAR COUPLING.

No. 496,494. Patented May 2, 1893.

Witnesses

Inventors
William R. Teeguarden
Robert A. Clark
John G. Clark
Attorneys (No Model.) 4 Sheets—Sheet 3.
W. R. TEEGUARDEN & R. A. & J. G. CLARK.
CAR COUPLING.
No. 496,494. Patented May 2, 1893.
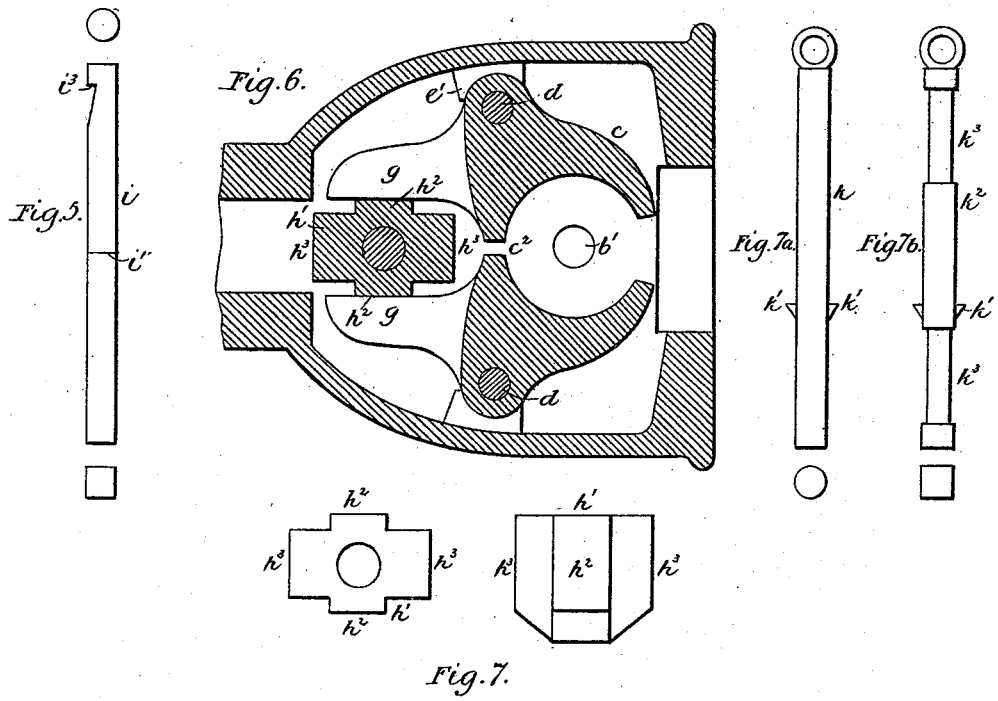
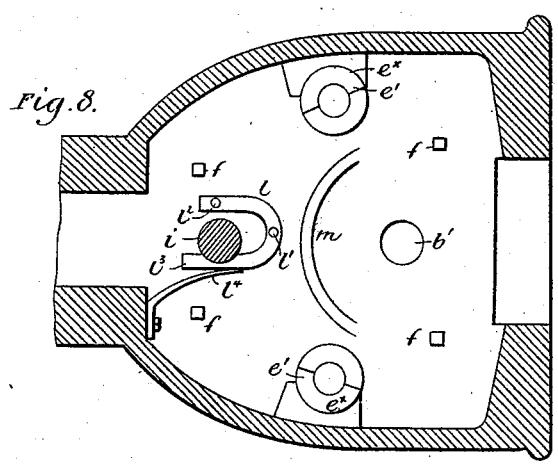
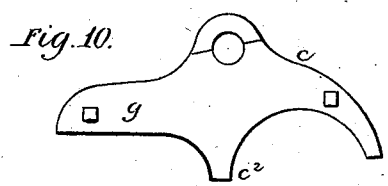
Witnesses
Inventors
William R. Teeguarden
Robert A. Clark
John G. Clark
Attorneys (No Model.) 4 Sheets—Sheet 4.
W. R. TEEGUARDEN & R. A. & J. G. CLARK.
CAR COUPLING.
No. 496,494. Patented May 2, 1893.
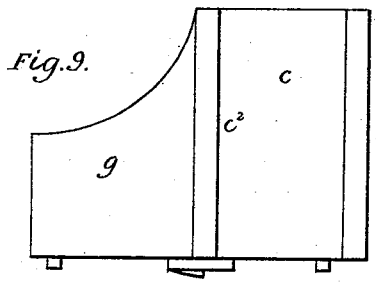
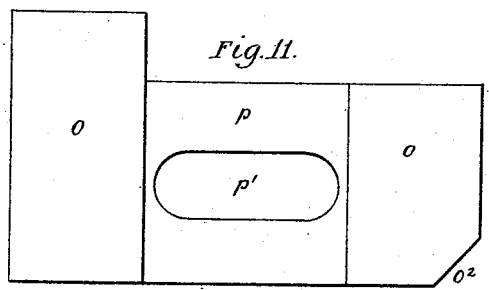
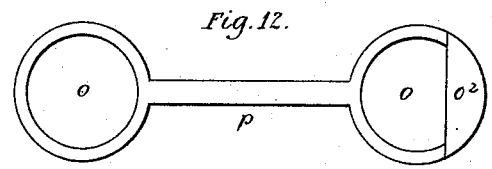
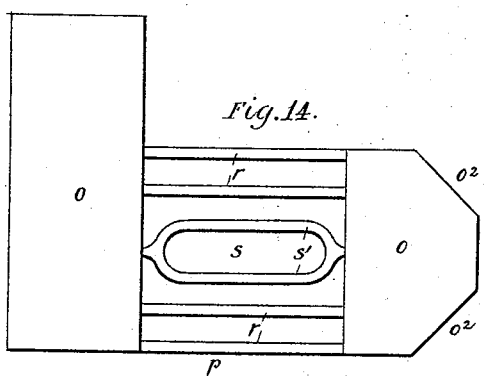
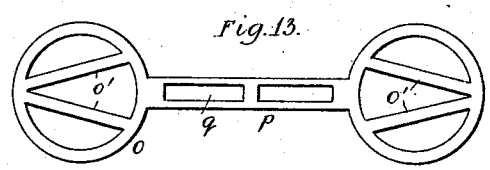
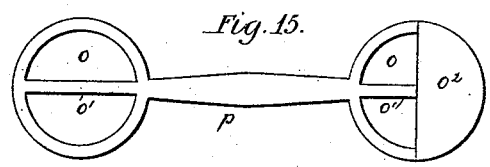
Witnesses
Inventors
William R. Teeguarden
Robert A. Clark
John G. Clark
By W. W. Dudley & Co
Attorneys

UNITED STATES PATENT OFFICE.

WILLIAM R. TEEGUARDEN AND ROBERT A. CLARK, OF COLFAX, AND JOHN G. CLARK, OF FRANKFORT, ASSIGNORS TO TEEGUARDEN, CLARK & CLARK, OF COLFAX, INDIANA.

CAR-COUPLING.

SPECIFICATION forming part of Letters Patent No. 496,494, dated May 2, 1893.

Application filed May 31, 1892. Serial No. 435,094. (No model.)

*To all whom it may concern:*

Be it known that we, WILLIAM R. TEEGUARDEN and ROBERT A. CLARK, of Colfax, and JOHN G. CLARK, of Frankfort, in the county of Clinton and State of Indiana, citizens of the United States, have invented certain new and useful Improvements in Car-Couplers; and we do declare the following to be a full, clear, and exact description of the invention, such as will enable others skilled in the art to which it appertains to make and use the same, reference being had to the accompanying drawings, and to the letters and figures of reference marked thereon, which form a part of this specification.

Our present invention has reference to that class of car couplers which is designated in the art as "twin jaw couplers," and it consists in general terms of a coupler formed of two movable jaws which in operation confine one of the heads of an improved coupling link, new and improved mechanism for automatically locking said jaws in their closed position, a box or casing for inclosing said jaws and which serves as a bumper to receive the shock and to protect the coupling devices from injury, and improved means for preventing a drawhead from dropping to the track in the event of an accidental disconnection thereof from the car.

It is the object of our invention to provide such a coupler as will overcome the many disadvantages and difficulties due to the employment of couplers now in general use, to simplify the construction and operation, and to reduce the liability to get out of order or become broken, and in such latter event to prevent accidents or derailments of the cars due to the falling of a disconnected drawhead.

The construction, relative arrangement and operation of the several parts constituting our invention will now be fully and clearly described, reference being had to the accompanying drawings forming a part of this specification and in which—

Figure 2:
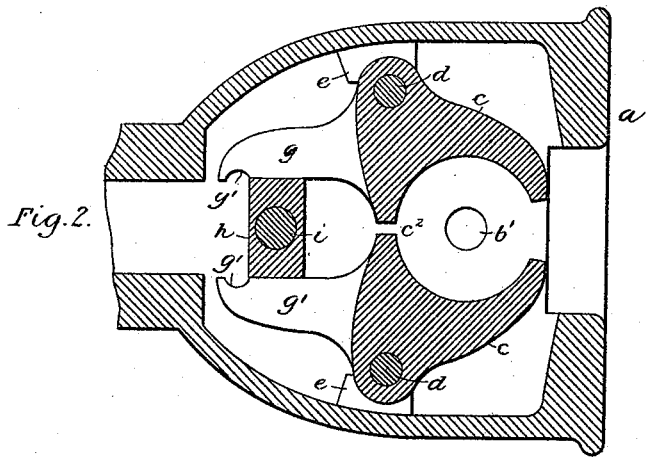
Figure 2:
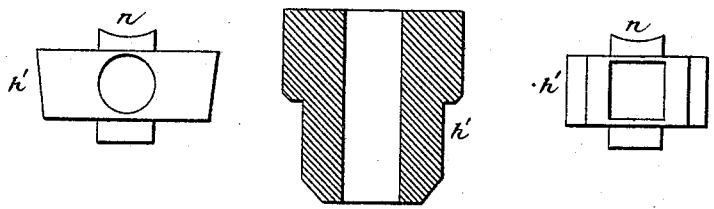
Figure 3:
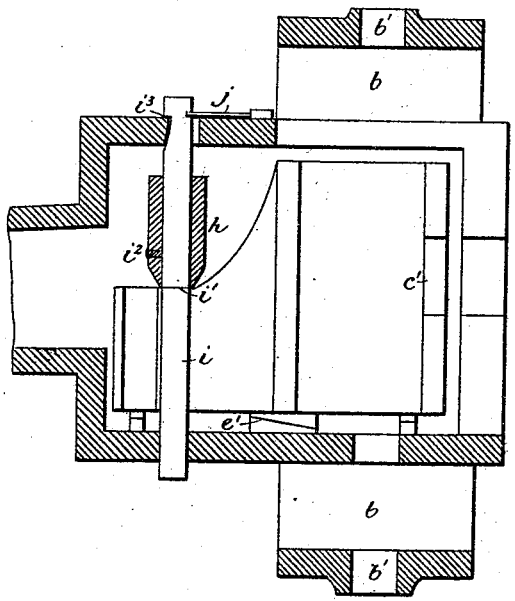
Figure 4:
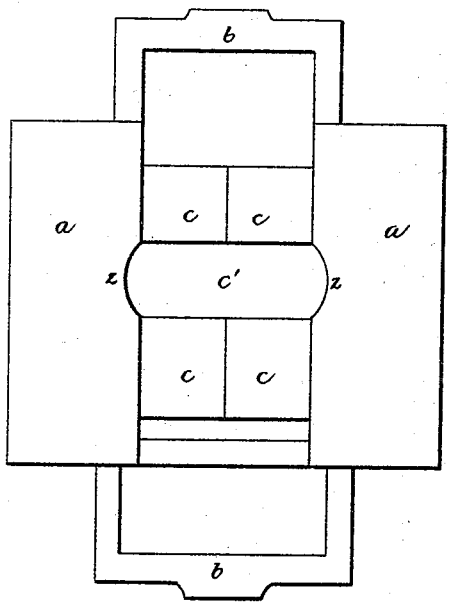

Figure 1 denotes in plan view our improved coupling; Fig. 2 a horizontal section thereof; Fig. 2$^a$ detail views of the wedge employed; Fig. 3, a longitudinal vertical section; Fig. 4 a transverse vertical section; Fig. 5 a detail view of the pin employed in connection with the wedge shown in Fig. 2$^a$; Fig. 6 a view similar to Fig. 2 but showing another form of wedge; Fig. 7, detail views of such wedge; Figs. 7$^a$ and 7$^b$ details of two forms of pins therefor; Fig. 8 a horizontal section showing a modified form of locking device, the jaws being removed; Figs. 9 and 10 respectively side and bottom views of one of the jaws showing the means for automatically opening the same; Figs. 11 and 12 side and bottom views of the coupling link; Fig. 13 a view of a link employing channeled heads and web; and Figs. 14 and 15 side and top views of a link having channeled heads and ribbed web.

Like letters of reference refer to like parts throughout the several figures of the drawings.

The reference letter A denotes the box or casing which incloses the coupling jaws and serves the purpose of a drawhead. The forward end $a$ of this casing is thickened as shown and presents a full flat face bumping surface extending from top to bottom, completely protecting all of the automatic and common coupling devices from any bump or jam when contact is made with other drawheads or with one of a similar pattern. In the forward end of the casing is a vertical opening which receives the link, and arranged above and below said opening are loops or straps $b$ the upper one of which operates to prevent the link and drawhead from becoming entirely disengaged and falling to the ground in the event of the latter being pulled out or broken, it being evident that if one drawhead should become detached from the car, the other head would continue to carry the detached head in comparatively the same position and thus avoid the wrecking or derailing of a car or train incident to the falling of the detached head to the ground. These loops are provided with openings $b'$ to receive a pin for coupling with a car having an ordinary link coupler. The jaws $c$ $c$ are pivoted within the casing pins $d$ $d$ being employed for this purpose and the latter are firmly held in lugs $e$ cast integral with the side walls of said casing. The upper portion of these lugs is cut away at $e^x$ and at this point is arranged a circular incline $e'$ which operates with a similar incline arranged on the under side of the jaws to normally open the latter, which have a slight vertical movement on the pins. Instead of this connection the jaws may be made to automatically open by employing the inclined lugs $f$ which are cast integral with the bottom of the casing, and which engage oppositely inclined lugs on the under side of the jaws. The jaws are provided at their inner ends with heels $g$ $g$ terminating in hook shaped portions $g'$ one of which is arranged above the other in order when the jaws are entirely opened these portions may slightly lap each other as will presently appear.

$h$ represents the wedge which enters the space between the heels when the jaws are closed and locks them in that condition. One form of wedge is illustrated in Fig. $2^a$ and consists of a block $h'$ fixed to a pin $i$ which works in openings formed in the top and bottom of the casing. The upper portion of this pin is circular in cross section, and the lower portion is rectangular, and at the intersection of these portions shoulders $i'$ are formed against which abuts the lower end of the wedge which is keyed in position as shown by a suitable screw $i^2$ or by any other means.

In the upper end of the pin $i$ is a notch $i^3$ which when the wedge is raised engages the rear side of the opening in the top of the casing, a spring $j$ or other suitable means being employed to retain it in this position. The upper portion of the wedge is greater in width than the remaining portion, and serves to retain the jaws in a wholly closed condition when connection is made with a drawhead having a common link. The lower portion of the wedge locks the jaws in a partially closed condition when connection is made with our improved construction of link. Another form of wedge and pin therefor is shown in Figs. 7, $7^a$ and $7^b$ in which the wedge is formed with four wedging surfaces, two of which $h^2$ $h^2$ serve to lock the jaws partially closed, and the other two $h^3$ $h^3$ which form the wide way of the wedge serve to lock the jaws entirely closed. Two forms of pins for this latter form of wedge are shown in Figs. $7^a$ and $7^b$ one of which $k$ is made circular in cross section and is provided with two lugs $k'$ $k'$ which fit correspondingly shaped recesses in the bottom of the wedge to prevent the latter from turning on the pin. The pin $k^2$ is square in cross section except at the points $k^3$ where it is made round to serve as bearing points for the top and bottom of the casing. This latter construction of wedge and the pins therefor are operated to partially close the jaws when employing our improved form of link, or wholly close the jaws when coupling with an ordinary link, by turning the pin and wedge to bring either the narrow or wide way of the latter in relation to the heels.

In the former or preferred construction the pin and wedge may be lowered sufficiently to bring the wide way thereof between the heels for closing the jaws, and be raised until the narrow way is presented to partially close the jaws. $c'$ is an opening made in the jaws for the reception of an ordinary link which is held by a pin insertible in the loops and between the jaws. The sides of the casing are also cut away at $z$ to correspond with the opening $c'$. The common link may be inserted in the opening $c'$, or between the bottom of the casing and the lower loop, thus suiting the different heights of couplers.

In operation when employing the construction of the drop wedge first described, the pin is raised by suitable mechanism until the notch engages the side of the opening in the top of the casing and is held in this position by the action of the spring or its equivalent. As the jaws open automatically by reason of the inclines employed the hooked-shaped extremities of the heels partially lap each other and engage the pin which is moved forward thereby sufficiently far to disengage the notch from the edge of the opening. The pin and wedge then drop by their own weight, the latter resting on the upper surface of the heels, and the parts are now in position for coupling automatically with a drawhead of similar construction. The advancing link, the construction of which will hereinafter fully appear, strikes against the inner curved faces $c^2$ of the jaws which close on the head of the link, and by the same action the heels are separated sufficiently to allow the narrow portion of the wedge to drop down and lock the parts in this position. In coupling with cars employing an ordinary pin and link device the jaws are entirely closed and the wide portion of the wedge dropped between the heels; the link is then inserted and the pin dropped through the openings in the upper loop and back of the jaws and thus the strain is brought on the jaws as well as on the loop.

In Fig. 8 is shown a construction of pin supporting device which comprises a U-shaped latch $l$ which is pivoted at $l'$ on the upper or lower surface of the bottom of the casing, and which is provided with a projection $l^2$ which extends upward a sufficient distance to be engaged by the adjacent heel when the latter is moved inward by the opening of the jaw. When the latch is placed on the under side of the casing the projection extends upward through a slot which is made long enough to allow for the requisite movement of the latch. It is also evident that the latch may be pivoted to the top of the casing as the operation would in this event be the same as that just described. The latch partially surrounds the pin of the wedge and one of its arms $l^3$ is held normally against the pin by the action of a spring $l^4$ secured at one end to the casing, or by any other suitable means. The pin is provided with a notch which engages, when the pin and wedge are raised a sufficient distance, the arm $l^3$ and are supported thereby until the heel of the jaw is moved against the projection $l^2$ which in operation actuates the latch to clear the notch in the pin and allow it and the wedge to fall between the heels to lock the jaws in position.

To protect the locking mechanism from the inward thrust of the coupling link, we provide a curved rib $m$ on the upper side of the bottom of the casing which acts with the throat in the top of the casing as stops for the head of the link and prevents a too deep penetration.

In Fig. 2ª which shows in detail our preferred form of wedge, $n$ represents a curved bearing surface which contacts with the inner ends of the heels at certain stages of the operation and operates to give easy action. The pin for this link is made square in its lower portion and fits a correspondingly shaped opening in the bottom of the casing in which it moves vertically but is prevented from revolving in order that the pin and wedge shall remain in its proper position and the notch be brought into contact with the rear of the opening in the top of the casing.

The narrow way of the wedge shown in Fig. 2ª is made rectangular in shape to conform to the shape of the heels when the jaws are partially closed, but when the jaws are entirely closed the heels are inclined away from each other, and the sides of the wide way of the wedge are inclined to conform thereto.

In Figs. 11 and 12 is shown a construction of link to be used with our improved coupler and which comprises two hollow heads $o$ connected by a web $p$, the latter being formed with an opening $p'$ which serves as a hand hold and also to lighten the weight. The heads are provided with one or more webs $o'$ which serve to give the requisite strength. The link is supported and held in position by the bottom of the casing and operates with the upper loop to prevent a detached head from falling to the ground. One of the heads $o$ is made longer than the other in order that when coupling with cars having a coupler of a different height the link may be inverted to present the outer head at a different level. The outer head is beveled at $o^2$ in order that it may lift or adjust itself should it strike any obstruction in entering the other head. In Fig. 13 the web is channeled out at $q$ to lessen the weight of metal.

Figs. 14 and 15 illustrate a form of coupler having hollow heads and strengthening webs, and in which the web connecting the heads is formed of comparatively thin metal strengthened by ribs $r$ either straight or of truss form. $s$ is an opening in the web similar to that shown in Fig. 11 and which is surrounded by a web $s'$.

We claim—

1. A car coupler comprising two movable jaws, heels extending inward from said jaws, and a drop wedge having a narrow and a wide portion and operating with said heels in such a manner as that the jaws may be locked in a closed or partially closed condition.

2. A car coupler comprising two movable jaws, heels extending inward from said jaws, a drop wedge having a narrow and a wide portion, a pin on said wedge normally locked, and mechanism for automatically unlocking said pin whereby the jaws may be held in a closed or partially closed condition.

3. A car coupler comprising two movable jaws, heels extending inward from said jaws, a drop wedge for locking the jaws, a pin connected with the wedge having a notch for engagement with the top of the draw-head when the pin and wedge are in a raised position, the lower end of the pin being adapted to be engaged and moved by the heels to disengage the notch from the head and permit the pin and wedge to drop.

4. A car coupler comprising a casing, two movable jaws, heels extending inward from said jaws, and having hooked-shaped extremities, a drop wedge for locking the jaws in a closed or partially closed condition, a pin connected with said wedge and having a notch adapted to engage the top of the casing when the pin and wedge are raised, and adapted to be disengaged therefrom by the action of the hook-shaped extremities when the jaws are opened.

5. In car couplers a combined drawhead and casing having its front end thickened and formed with a flat faced bumping surface and the loops secured above and below said casing for the purposes described.

6. A car coupler comprising two movable jaws and an invertible link for said jaws formed of two vertically arranged cylindrically shaped heads connected by a web one of said heads having a height greater than the other to adapt it to different heights of couplers.

7. A car coupler comprising two movable jaws and an invertible link for said jaws formed of two vertically arranged hollow cylindrically shaped heads connected by a partially solid head, one of said heads having a height greater than the other for the purpose set forth.

8. A car coupler comprising a casing having a front bumping surface, two movable jaws having a transverse opening in the outer ends thereof to receive an ordinary link, loops arranged above and below said casing and having openings therein for the purposes set forth.

In testimony whereof we affix our signatures in presence of two witnesses.

WILLIAM R. TEEGUARDEN.
ROBERT A. CLARK.
JOHN G. CLARK.

Witnesses:
CHAS. S. ASHMAN,
GEO. B. NORRIS.